July 17, 1962   L. B. WRIGHT   3,044,803
FIFTH WHEEL ASSEMBLY
Filed Nov. 4, 1960   2 Sheets-Sheet 1
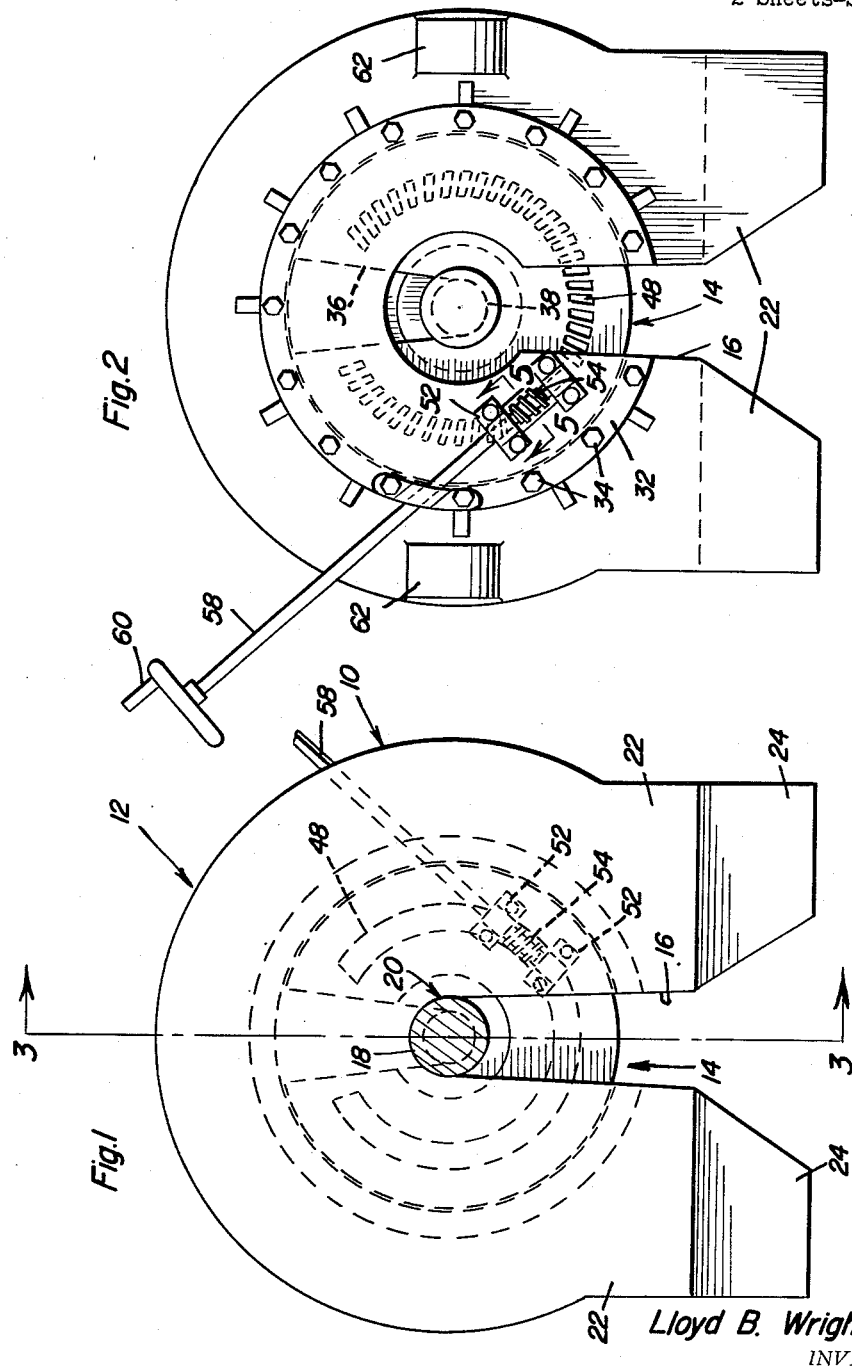
Lloyd B. Wright
INVENTOR.
BY *Clarence A. O'Brien*
*and Harvey B. Jacobson*
Attorneys

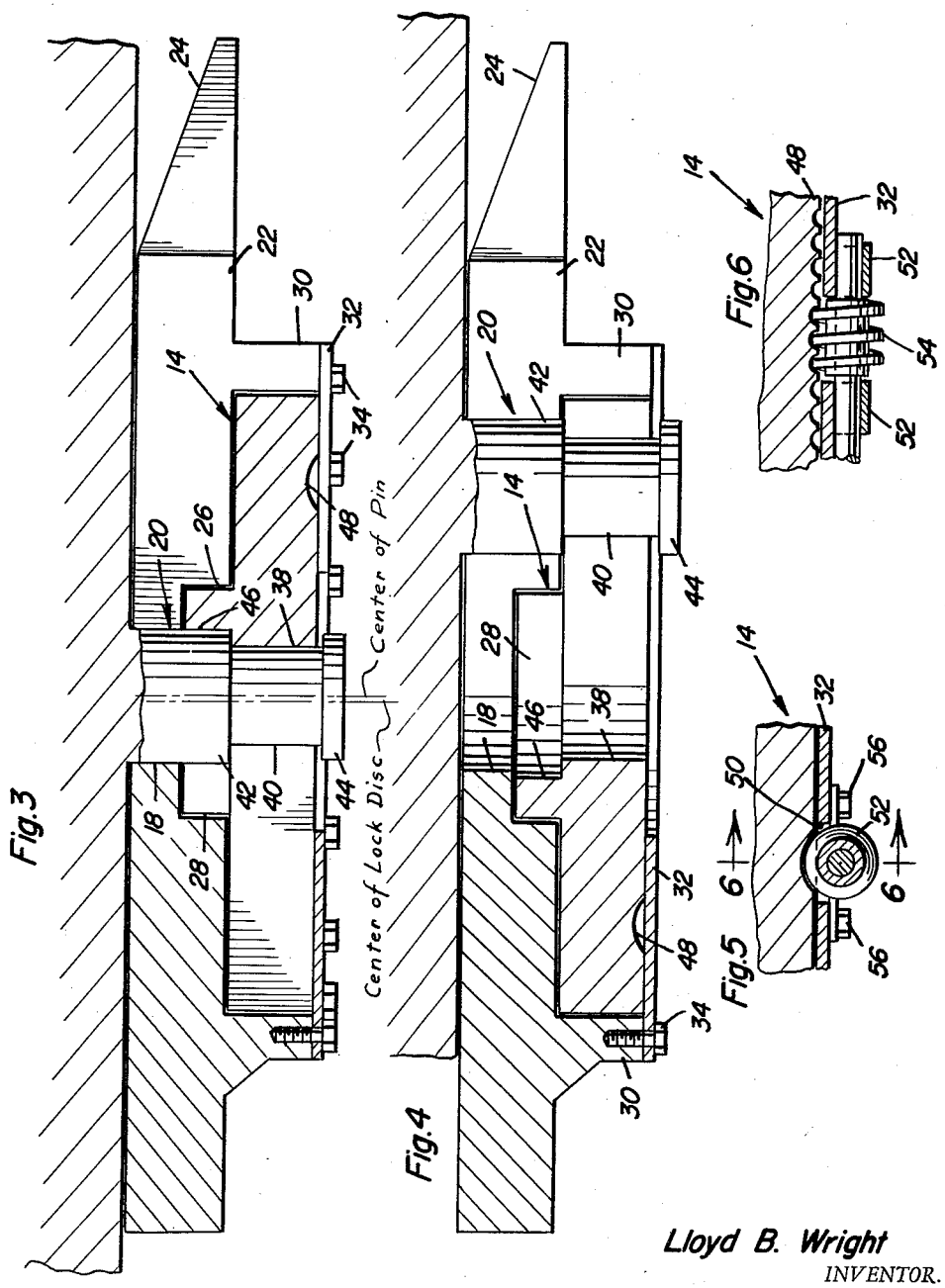

United States Patent Office 3,044,803
Patented July 17, 1962

3,044,803
FIFTH WHEEL ASSEMBLY
Lloyd B. Wright, 8762 Acacia Ave., Garden Grove, Calif.
Filed Nov. 4, 1960, Ser. No. 67,421
9 Claims. (Cl. 280—433)

This invention relates to a novel and useful fifth wheel assembly and more particularly to a fifth wheel assembly provided with two substantially horizontally disposed slotted plates with one mounted on the other for rotation relative thereto. One of the plates is substantially the same as a conventional fifth wheel assembly saddle plate whose slot terminates in a semi-cylindrical end wall adapted to seatingly receive a kingpin. The other or lock plate is rotatably mounted on the saddle plate and is also provided with a slot which terminates in a semi-cylindrical camming wall adapted to conform to and seatingly receive a kingpin. The lock plate is mounted for rotation about an axis coinciding with the longitudinal axis of the camming wall, alined with and spaced slightly inwardly of and generally paralleling the longitudinal axis of the cylindrical end wall of the saddle plate.

In securing a kingpin to the fifth wheel assembly, the two plates are rotated relative to each other until the slot in the lock plate is alined with the slot in the saddle plate whereupon a kingpin may then be passed through the alined slots and seated against the semi-cylindrical end wall of the saddle plate. The lock plate is then rotated relative to the saddle plate approximately 180° whereupon the sides of the slot therein and the semi-cylindrical camming wall will cam the kingpin into tight seated engagement with the semi-cylindrical end wall of the saddle plate on one side of the kingpin and with the semi-cylindrical camming wall on the other side of the kingpin. In this manner, the kingpin may be locked within the fifth wheel assembly against movement in a plane perpendicular to the axis of rotation of the kingpin but in a manner in which the kingpin will be free to rotate about its longitudinal axis.

The main object of this invention is to provide a fifth wheel assembly which will be capable of mounting a kingpin for rotation about its longitudinal axis and against substantially all movement in a plane extending at right angles to the longitudinal axis of the kingpin.

A further object of this invention is to provide a fifth wheel assembly which will be capable of positively locking a kingpin to the fifth wheel assembly with the parts of the fifth wheel assembly locking the kingpin in engagement therewith being disposed in a manner whereby a pull on the kingpin in any direction in a plane extending at substantially right angles to the axis of rotation of the kingpin will be ineffective to apply any force in a direction tending to unlock the kingpin from engagement with the fifth wheel assembly.

A still further object of this invention, in accordance with the preceding objects, is to provide a fifth wheel assembly adapted to also positively prevent axial movement of a kingpin locked in engagement therewith.

A final object to be specifically enumerated herein is to provide a fifth wheel assembly which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the fifth wheel assembly comprising the present invention showing the saddle plate and lock plate thereof disposed in relative positions locking a kingpin in engagement therewith, the kingpin being shown in section;

FIGURE 2 is a bottom plan view of the fifth wheel assembly;

FIGURE 3 is a longitudinal vertical sectional view on somewhat of an enlarged scale taken substantially upon the plane indicated by the section line 3—3 of FIGURE 1;

FIGURE 4 is a longitudinal vertical sectional view similar to FIGURE 3 but showing the saddle and lock plates disposed in positions relative to each other for receiving a kingpin being moved into engagement therewith;

FIGURE 5 is an enlarged vertical sectional view taken substantially upon the plane indicated by the section line 5—5 of FIGURE 2; and FIGURE 6 is a vertical sectional view taken substantially upon the plane indicated by the section line 6—6 of FIGURE 5.

Referring now more specifically to the drawings, the numeral 10 generally designates the fifth wheel assembly of the instant invention which includes a saddle plate generally referred to by the reference numeral 12 and a lock plate generally referred to by the reference numeral 14.

The saddle plate 12 may be considered to be substantially conventional as it is provided with a radial slot 16 terminating at its inner end in a semi-cylindrical end wall 18 for seatingly receiving the surfaces of one side of a kingpin such as the kingpin generally designated by the reference numeral 20.

The rear ends of the arms 22 of the saddle plate 12 defined by the slot 16 are provided with beveled portions 24 as is conventional and the side walls of the slot 16 are slightly rearwardly divergent for guiding the kingpin 20 into seated engagement with the semi-cylindrical end wall 18.

The saddle plate 12 is provided with a downwardly opening cylindrical recess 26 in its lower surface which is alined with the longitudinal axis of the end wall 18 and the kingpin 20 seated in engagement therewith. The lock plate 14 is provided with a centrally disposed and upwardly projecting cylindrical shoulder 28 on its upper surface which is snugly and rotatably received within the recess 26. The saddle plate 12 also includes a downwardly projecting annular shoulder 30 in which the lock plate 14 is snugly and rotatably received. A cover or retaining plate 32 is secured over the lower surfaces of the annular shoulder 30 by means of suitable fasteners 34 and encloses the lock plate 14 within the confines of the saddle plate 12.

The lock plate 14 is also provided with a radial slot 36 which terminates at its inner end in a semi-circular camming wall 38. It is to be noted that the saddle plate is mounted for rotation about an axis coinciding with the longitudinal axis of the camming wall, alined with and spaced slightly inwardly of the kingpin slot 16 and generally paralleling the longitudinal axis of the end wall 18. Thus, it will be noticed that the center of the semi-cylindrical camming wall 38 of the lock plate 14 is spaced slightly forwardly of the center of the semi-cylindrical end wall 18 and in alinement with the slot 16. The kingpin 20 includes a lower diametrically reduced portion 40 and an upper diametrically enlarged portion 42. The kingpin 20 also includes a diametrically enlarged portion 42. The kingpin 20 also includes a diametrically enlarged lower terminal end portion 44.

The camming wall 38 includes an upper portion 46 having a greater radius than the lower portion thereof substantially equal to the radius of the end wall 18 and the upper diametrically enlarged portion 42 of the kingpin 20.

With attention now directed to FIGURES 1, 3 and 6 it will be noted that the lock plate has a ring gear 48 formed integrally therewith and that the retaining plate 32 has a slot 50 formed therein through which a worm gear journaled by means of bearing journals 52 projects and meshes with the ring gear 48. The worm gear is designated by the reference numeral 54 and the bearing journals 52 are secured to the lower surface of the retaining plate 32 by means of suitable fasteners 56. One end of the worm gear 54 has a shaft 58 connected therewith which has secured to its outer end a crank wheel 60 for rotating the shaft 58 and effecting rotation of the lock plate 14 relative to the saddle plate 12.

The saddle plate 12 is of course provided with heavy duty bearing journals such as journals 62, see FIGURE 2, for pivotally mounting the saddle plate 12 to a draft vehicle for movement about an axis extending generally perpendicular to the axis of rotation of the lock plate 14.

In operation, when it is desired to secure the kingpin 20 to the fifth wheel assembly 10, the lock plate 14 is rotated relative to the saddle plate 12 until the slot 36 is alined with the slot 16. The kignpin 20 is then slid through the alined slots 16 and 36 and seated in engagement with the end wall 18. The lock plate 14 is then rotated approximately 180° during which rotation the side of the slot 36 and the semi-cylindrical camming wall 38 will cam the kingpin 20 into tight seated engagement with the end wall 18 and the semi-cylindrical camming wall 38. Of course, when it is desired to disengage the kingpin 20 from the fifth wheel assembly the preceding procedure is reversed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fifth wheel assembly comprising a generally horizontal saddle plate, a kingpin slot in said plate terminating at one end in a semi-cylindrical end wall adapted to conform to and seatingly receive a kingpin, a lock plate, a radial slot in said lock plate terminating at its inner end in a semi-cylindrical camming wall adapted to conform to and seatingly receive a kingpin, means rotatably mounting said lock plate beneath said saddle plate for rotation about an axis coinciding with the longitudinal axis of said camming wall, said axis of rotation alined with said kingpin slot and generally paralleling and spaced slightly inwardly of the longitudinal axis of said end wall, and means for effecting rotation of said lock plate relative to said saddle plate.

2. The combination of claim 1, wherein at least the lower portion of said camming wall has a smaller radius than said end wall.

3. A fifth wheel assembly comprising a generally horizontal saddle plate, a kingpin slot in said plate terminating at one end in a semi-cylindrical end wall adapted to conform to and seatingly receive a kingpin, a lock plate, a radial slot in said lock plate terminating at its inner end in a semi-cylidnrical camming wall adapted to conform to and seatingly receive a kingpin, means rotatably mounting said lock plate beneath said saddle plate for rotation about an axis coinciding with the longitudinal axis of said camming wall, said axis of rotation alined with said kingpin slot and generally paralleling and spaced slightly inwardly of the longitudinal axis of said end wall, and means for effecting rotation of said lock plate relative to said saddle plate, at least the lower portion of said camming wall having a smaller radius than said end wall, said saddle plate includes a downwardly opening generally cylindrical recess formed in the lower face thereof concentric with the axis of rotation of said lock plate, said mounting means including an upwardly projecting generally cylindrical shoulder on the upper face of said lock plate concentric with the axis of rotation of the latter rotatably received in said recess.

4. The combination of claim 3, including an upper portion of said camming wall having substantially the same radius as said end wall.

5. The combination of claim 4, wherein said upper portion of said camming wall is formed entirely within said shoulder.

6. The combination of claim 1, including a depending annular shoulder portion on said saddle plate receiving said lock plate, a retaining plate secured over the lower surfaces of said annular shoulder portion enclosing said lock plate.

7. A fifth wheel assembly comprising a generally horizontal saddle plate, a kingpin slot in said plate terminating at one end in a semi-cylindrical end wall adapted to conform to and seatingly receive a kingpin, a lock plate, a radial slot in said lock plate terminating at its inner end in a semi-cylindrical camming wall adapted to conform to and seatingly receive a kingpin, means rotatably mounting said lock plate beneath said saddle plate for rotation about an axis coinciding with the longitudinal axis of said camming wall, said axis of rotation alined with said kingpin slot and generally paralleling and spaced slightly inwardly of the longitudinal axis of said end wall, and means for effecting rotation of said lock plate relative to said saddle plate, a depending annular shoulder portion on said saddle plate receiving said lock plate, a retaining plate secured over the lower surfaces of said annular shoulder portion enclosing said lock plate, said rotation means includes a ring gear carried by the lower face of said lock plate, a worm gear journaled for rotation on said retaining plate, projecting through an opening formed in the latter and meshed with said ring gear, and means for effecting rotation of said worm gear.

8. The combination of claim 1, including an upper portion of said camming wall having substantially the same radius as said end wall.

9. The combination of claim 8, wherein said upper portion of said camming wall is formed entirely within said shoulder.

References Cited in the file of this patent
UNITED STATES PATENTS

| | | |
|---|---|---|
| 1,922,359 | Edwards | Aug. 15, 1933 |
| 2,459,772 | Kinne | Jan. 18, 1949 |